US006003313A

United States Patent [19]

Farrar

[11] Patent Number: 6,003,313

[45] Date of Patent: Dec. 21, 1999

[54] HIGH PRESSURE TO LOW PRESSURE EXCHANGE SYSTEM FOR HYDRAULIC DRIVES

[76] Inventor: Johnny Farrar, 12340 Quitman Meridian Hwy., Meridian, Miss. 39301

[21] Appl. No.: 08/948,795

[22] Filed: Oct. 10, 1997

Related U.S. Application Data

[60] Provisional application No. 60/028,835, Oct. 21, 1996.

[51] Int. Cl.$^{6}$ .......................................................... F16D 31/02

[52] U.S. Cl. ................................. 60/421; 60/424; 60/426; 60/453; 60/456; 60/428; 91/516; 91/520

[58] Field of Search .............................. 60/421, 424, 426, 60/428, 459, 453, 456; 91/516, 520

[56] References Cited

U.S. PATENT DOCUMENTS

| | | | |
|---|---|---|---|
| 2,506,911 | 5/1950 | Zeigler . | |
| 2,855,110 | 10/1958 | Prichard . | |
| 3,171,504 | 3/1965 | Noll et al. . | |
| 3,489,235 | 1/1970 | Watson . | |
| 3,561,523 | 2/1971 | Vertesi . | |
| 3,853,272 | 12/1974 | Decker et al. . | |
| 3,937,596 | 2/1976 | Braidwood . | |
| 3,978,998 | 9/1976 | Klitz . | |
| 4,023,364 | 5/1977 | Bianchetta . | |
| 4,055,046 | 10/1977 | Schexnayder . | |
| 4,171,054 | 10/1979 | Tanaka et al. . | |
| 4,177,869 | 12/1979 | Crabiel . | |
| 4,273,503 | 6/1981 | Dameron . | |
| 4,343,151 | 8/1982 | Lorimor | 91/516 X |
| 4,394,886 | 7/1983 | Rathje et al. . | |
| 4,415,050 | 11/1983 | Nishida . | |
| 4,467,604 | 8/1984 | Forster . | |
| 4,958,696 | 9/1990 | Lerchbaum | 60/424 X |
| 5,052,179 | 10/1991 | Fujii | 60/421 |
| 5,083,428 | 1/1992 | Kubomoto et al. | 60/421 |
| 5,333,452 | 8/1994 | Dameron . | |
| 5,533,333 | 7/1996 | Pullar et al. | 60/456 X |

*Primary Examiner*—Hoang Nguyen

[57] ABSTRACT

A boom and drive train hydraulic system is described having a pressure source, preferably a pump operated by a motor, said pressure source providing hydraulic fluid at a high pressure to a first set of valves used to operate the drive train of the system. The first set of valves is equipped with a power beyond for allowing the hydraulic fluid to flow from the first set of valves to a second set of valves. At the second set of valves a pressure control is provided to reduce the pressure to a desired lower pressure. The second set of valves provides the hydraulic fluid at this reduced pressure to the boom portion of the system. The differential of the pressures is approximately 5,000 psi for the track system and approximately 2,500 psi for the boom system.

20 Claims, 5 Drawing Sheets

HIGH PRESSURE TO LOW PRESSURE EXCHANGE SYSTEM FOR HYDRAULIC DRIVES

PRIORITY STATEMENT

This patent is a continuation in part of Provisional Patent Ser. No. 60/028,835 filed Oct. 21, 1996.

BACKGROUND OF INVENTION

PRIOR ART

Boom operated systems are well-known in the art of hydraulics. In a typical hydraulic system, hydraulic fluid is put under pressure by a pump which is usually driven, in turn, by a diesel engine. The hydraulic fluid under pressure from the pump enters a pipe to a valve entrance and a pressure regulator at the entrance location of the valve regulates the pressure of the hydraulic fluid in the valve.

In the present case, for example the hydraulic fluid at a volume of 50 gallons per minute enters the valve system and a spring-actuated pressure release regulates the pressure at approximately 4,000 pounds per square inch. This pressure control may be preset or may be adjustable by the user.

The hydraulic fluid then enters selectively, according to the control of the user, the several hydraulic valve cylinders. The hydraulic fluid eventually goes through a fluid return into a return pipe and back into a cooling system and then on to the fluid hydraulic tanks. These tanks serve as a reservoir from which the hydraulic pumps draw hydraulic fluid to restart the cycle.

A power beyond allows the hydraulic fluid to go from the valve returns to the fluid return but interrupts the flow directly from the valve entrance to the fluid return. Instead, the power beyond directs the hydraulic fluid under full pressure to a separate set of hydraulic cylinders which otherwise function identically to the first set.

GENERAL DESCRIPTION OF THE INVENTION

The primary inventive concept embodied in the current invention can be found where the hydraulic fluid from the first set of hydraulic valves enters the second set of hydraulic valves. Under pre-existing prior art, this second valve set has a pressure control which functions identically to the first pressure control. The pressure differential of the two valves is less than 100 pounds per square inch.

The modification in the present invention is to adjust the second pressure controls to a greatly-reduced pressure. The difference with which this second system receives hydraulic fluid from the power beyond is 500 PSI or greater.

The detailed embodiment disclosed hereafter, shows a novel hydraulic system which has one set of valves at high pressure feeding, through a power beyond, a second set of valves at a significantly lower pressure. This, detailed specification is specifically directed to a mobile boom. There is an upper boom system utilizing low hydraulic pressure and lower tract system operating utilizing the high pressure system. This arrangement has several safety features discussed in more detail below.

The reason for this specific embodiment is that the track system requires 4,000 pounds per square inch, approximately, of hydraulic pressure to operate the hydraulic motors moving the mobile boom. The reason is that it requires a tremendous amount of force in order to move a tractor forward. Typically these tractors are on treads because of the difficult terrain which is encountered. Boom systems, on the other hand typically require only 2,000 to 3,000 pounds per square inch to operate effectively. This second, relatively low pressure hydraulic system is much less expensive and less dangerous. It is, therefore, desirable to have a low pressure system when low-pressure hydraulics can be used.

In the preferred embodiment, dual high pressure cylinders are used. It is possible to have two different secondary, lower hydraulic systems operating at different pressures utilizing a power beyond from each of these two high pressure sets of valves.

It is, therefore, one object of this invention to have a high-pressure hydraulic system and a low-pressure hydraulic system running off a common high-pressure pump.

The preferred embodiment of the invention is practiced at 2,000–3,000 PSI upper hydraulic system in series with a 3,500–5,000 hundred pound per square inch system. As can seen by reference to the description below, a 3,500–5,000 PSI system may lower hydraulics used with both a 1000 PSI and a 3000 PSI system given the technology disclosed. It is therefore an object to provide for multiple low hydraulic systems at different pressures from a single hydraulic pressuring system.

It is a further purpose of this invention to have the high-pressure 3500 to 4000 PSI system control a system of tracks which have hydraulic motors.

It is a further purpose of this invention to have the boom system for the low hydraulic system operating at 2500 PSI or less.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DISCUSSION OF THE PREFERRED EMBODIMENT(S)

Figure 1:
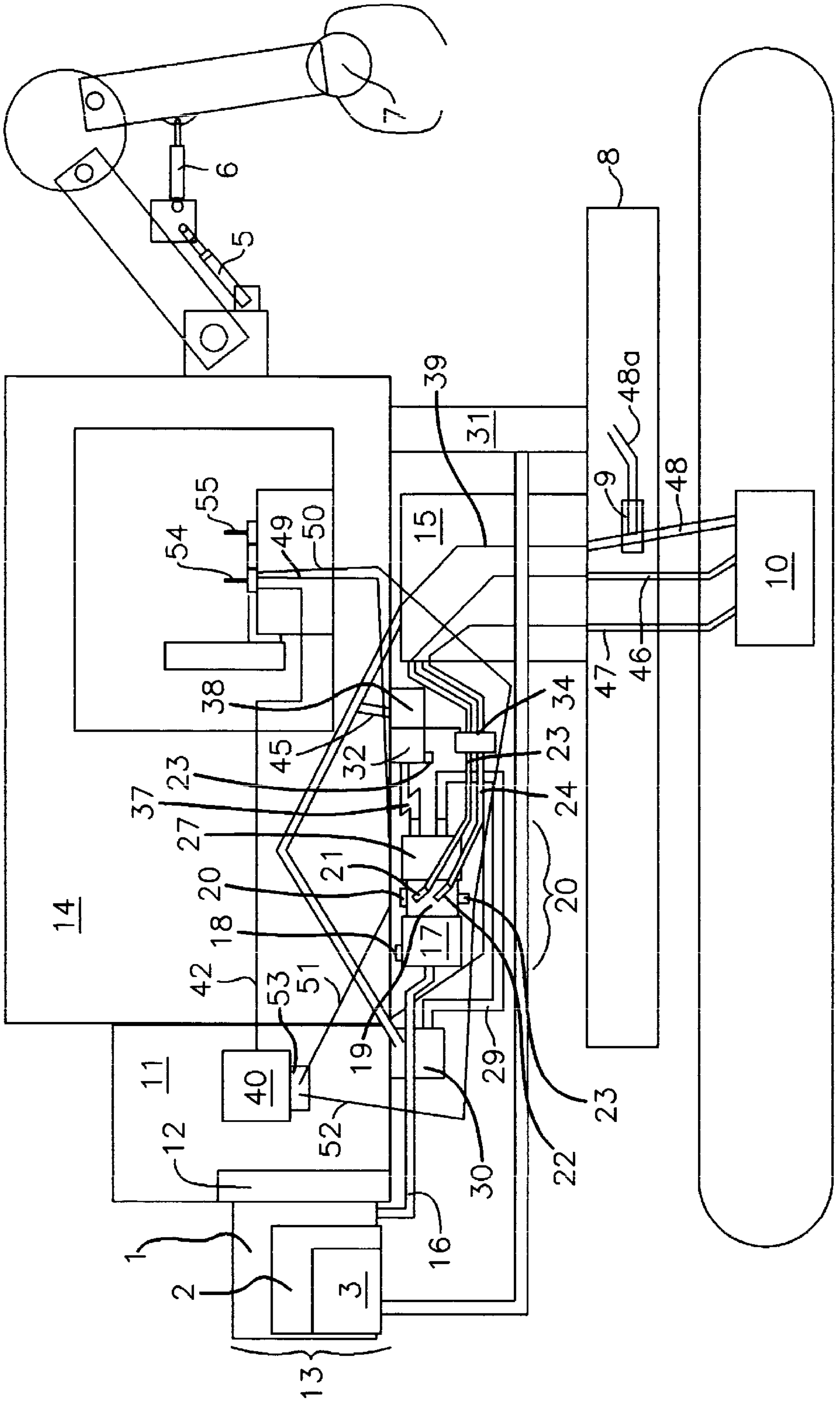
FIG. 1 shows a black box diagram of the preferred embodiment utilizing this technology.

The preferred embodiment shown in FIG. 1 is a diesel engine 11 having a direct drive flywheel 12 which turns a three stage hydraulic pump 13 having stages 1, 2 and 3. Stages 1 and 2 in this embodiment are 50 gallon per minute 4000–4500 PSI pump stages and stage 3 is a smaller 30 gallon per minute pump at approximately 2500 PSI. This 30 gallon stage turns a swivel motor 31 for turning the main housing 14 as discussed in more detail below.

The diesel engine 11 and pump 13 are mounted on a main housing 14 which also serves as a control center and an anchor point for the boom system 4 described below.

A swivel 15 carries hydraulic fluid from the valve 19 on the main housing 14 to the track hydraulic motor 10 in any of the ways shown in the prior art. Here, a hydraulic swivel 15 is used.

The hydraulic fluid from the pump 1 go to right high pressure valve 19. The first is described, the second is identical in the preferred embodiment except that the second power beyond 67*a* may supply pressure at a lower or different pressure from the first where this is desired. For convenience they are shown on different sides of the housing 14. In another embodiment, the second set of valves 19*a* would be on the same side as valve 19.

Hydraulic fluid or oil leaves the pump stage 1 through first pump line 16 under approximately 4000–4500 PSI by way of first pump line 16 and travels to high pressure valve entrance 17 having a high pressure control 18. The hydraulic fluid then moves into the right high pressure valve 19. The valves have forward and reverse pilot hydraulic fluid drives 20 and 28 respectively which directs the flow of hydraulic fluid to either the forward outlet 21 or the reverse outlet 22 of the hydraulic track motor 10 by way of swivel 15. Forward lines 23 and reverse valve line 24 take the hydraulic fluid from 21 and 22 respectively to priority valves 34. Then forward priority line 35 and reverse priority line 36 take the fluid to the swivel 15. From the swivel 15, the fluid goes to forward track lines 25 and reverse track line 26 which take the fluid for forward and backward movement respectively of the hydraulic motor 10.

A priority or control valve may be added between the swivel or collector 15 and the high pressure valve 19 to adjust the flow of hydraulic fluid to the tracks. If more torque is necessary the flow of hydraulic fluid is cut by the priority valve. The priority valve only adjusts the volume of the hydraulic fluid by directing at least a portion of the hydraulic fluid from the high pressure valve to the hydraulic tank while allowing the rest to continue on into the swivel 15 at the same pressure. This allows the engine to give greater torque by having a lesser flow for situations where, for example, the tracks are stuck in mud.

The power beyond 27 provides for an outlet for the majority of the hydraulic flow from the pump first stage 1 received at the inlet 17.

Return line 29 to a common tank 30 provides for the return of the hydraulic fluid from the operation of the right high pressure valve 19 which operates the hydraulic motor 10. Return line 29 carries hydraulic fluid at from the valve at tank pressure which may be as low as 15 PSI or lower.

This hydraulic system power beyond 27 directs the hydraulic fluid not powering valves 19 at full pressure to a main boom pipe 37 which, in the preferred embodiment powers the main boom hydraulic valve 38 which control the main boom cylinder 5 of the boom system 4.

Second stage 2 provides hydraulic fluid to line 16*a* to power left track motor 10*a* by way of left high pressure valves 19*a*.

Figure 2:
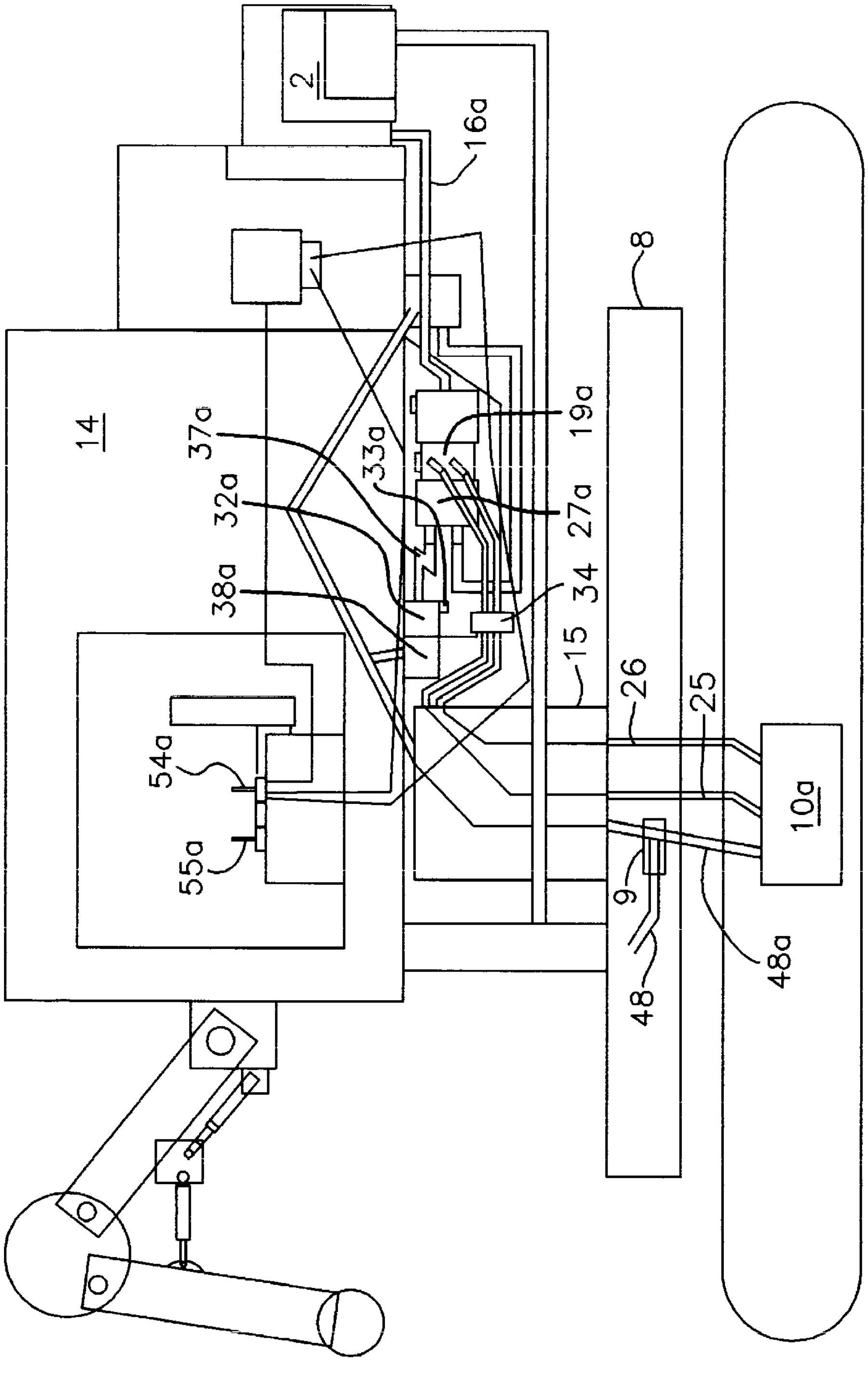
FIG. 2 shows a black box diagram showing the opposite side valves from FIG. 1 which are largely a mirror image of those shown in FIG. 1 although they receive fluid from an alternative stage of the pump.
Figure 3:
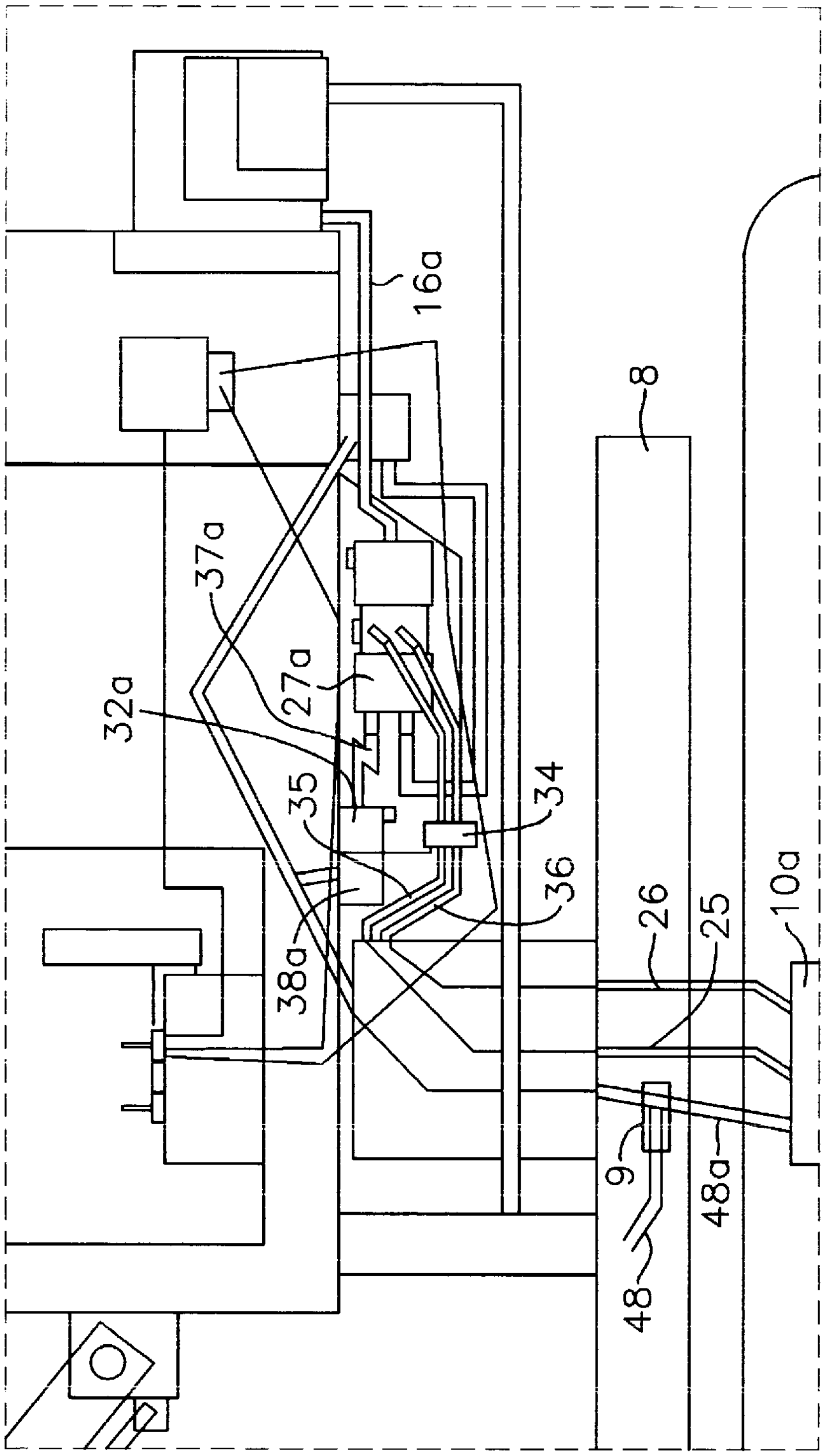
FIG. 3 shows a close up of the two valve set shown in FIG. 2.

The minor boom pipe 37*a* powers the minor boom hydraulic valve 38*a* which controls grapple 7 and boom 6 as shown in FIG. 2 via left power beyond 27*a*.

There are two identical high pressure hydraulic systems in the preferred embodiment as described above, one being for the right track motor 10 and one for the left track motor 10*a* respectively. Both operate identically, just powering different motors (10 & 10*a*). In an alternate embodiment a larger set of valves could power both motors (10 & 10*a*).

The power beyond 27 feeds hydraulic fluid at 3500–4000 PSI to a power beyond main boom pipe 37 which goes to a main boom valve input 32. Main valve input 32, in turn, has a low pressure control 33 which maintains the pressure to low pressure valves 38 at a lower pressure, approximately 2500 PSI. The second series of main boom valves 38 are more numerous because of the increased boom functions. These are in series and are powered by hydraulic fluid at this reduced low pressure (2500 PSI) system. As is common in the art, there is a separate pilot pump 40 which is driven directly from the engine 11 which is not directly associated with this hydraulic system which has a much lower hydraulic pressure, perhaps 500 PSI which operates the pilot drives 20 & 28. Here pilot pipe 42 goes to the pilot which sends fluid selectively to pilot forward 19 or pilot reverse 20 and then to pilot tanks and through pilot return forward line 51 or pilot return reverse line 52.

Since two identical units are desirable since there are two tracks run by motors 10 & 10*a*, then the preferred embodiment has two separate hydraulic systems to power the boom and/or swivel. In this case, a main boom line from power beyond 27 is used to power the 2500 PSI low hydraulic pressure system to the main boom cylinder 5 which may comprise two hydraulic cylinders and the second hydraulic system power beyond 27*a* powers, at 2500 PSI or perhaps less, the grapple 7 and a single boom piston 6.The operation of the valves to the booms are understood from the prior art past the point where the pressure is reduced to 2500 PSI or less at 33 and 33*a*.

Two low pressure valve systems 38 and 38*a* are useful in this embodiment since two high pressure valve systems 19 and 19*a* are necessary in order to power the two track motors 10 & 10*a* with the same degree of force. Lesser force to either of the tracks could adversely affect the direction control. However, in any system utilizing an extremely high pressure hydraulic system operating with a system which may have a lower hydraulic pressure, the same benefit could be realized even if only one hydraulic power beyond to a low pressure valve grouping was necessary.

The swivel 15 has a single swivel return line 39 which brings oil from motors 10 and 10*a* back to tank 30 from a common motor return valve 9 on a common track support pilot which carries the main housing 14 and both tracks 10 and 10*a*.

No additional power source is needed in order to power the low hydraulic system which receives its hydraulic fluid by way of a power beyond to the right 27 and 27*a* to the left from the high pressure hydraulic system and merely regulates the pressure at the low pressure valve entry point.

In the present case, a relatively low pressure system (2500 PSI) is available to operate the grappling arm hydraulics without having to have separate pumps or more than two separate pump stages. Typically more than three pumps in series would be cumbersome, expensive to maintain and require more power than is desired from the diesel engine.

This particular embodiment, has two high pressure hydraulic systems driving two lower pressure hydraulic systems, a special sharing of power is present where two high pressure hydraulic systems pressure two portions of a low hydraulic pressure system.

One advantage is due to the lesser expense of the upper low pressure hydraulic systems. This saves money on the number of pumps necessary in order to have a high pressure hydraulic drive along with a boom system and also allows for the relatively dangerous high pressure hydraulic system to be isolated while maintaining a low pressure hydraulic system in the area of the operator area.

In addition, the system easily adapts well to powering existing low pressure hydraulic boom systems which are to be mounted on tracks.

This is because the safer and less expensive upper hydraulic system operating booms are typically low pressure hydraulic systems, and the high pressures are much more expensive. This system allows one of the less-expensive low units to be maintained in essentially the same in place while a high pressure track system is used. The new changes which need to be made lies in the different hydraulic pumps and special arrangement of valves and power beyonds which need to be run by the diesel engine which is standard. These higher pressure pumps are routed through the two high pressure valve systems discussed above (one for each track). The hydraulic fluid is recycled if taken off by power beyond and used to power the existing low pressure system.

In order to accomplish this, another modification necessary other than changing the pump is to remove the hoses that went to the old pump and hooked into the power beyond to the pressure dropping chamber of the second valve.

A second modification is, a bumper system for a boom platform having a rear attached engine compartment comprising a rear metal grill section swivelled off of a fixed metal grill system to either side of the boom housing. This rear section could swivel outward in order to allow the engine to be worked on and may also have a smaller compartment to allow access to the engine portions requiring service.

The hydraulics system may also utilize one or both of the high pressure hydraulic systems to power a regular hydraulic saw, a delimber saw or a coping saw. This will be particularly possible utilizing this system when the hydraulic fluid going to the tracks could be disconnected to drive the track or a separate valve could be attached to one of the hydraulic valve driving the high pressure track and that second valve could be used to power the saw or yet another alternative in order to maintain the consistency of the power to the two tracks even when the saw was operating. Although that is not typically done, one of the two power beyonds may go to a similarly high pressure hydraulic saw secondary valve and the single remaining power beyond could power a single set of boom low pressure hydraulic cylinders.

Likewise, such a scenario, the 30 gallon pump could power the boom utilizing low pressure hydraulic fluid while the low pressure hydraulic fluid from the hydraulic valve system could be used to power the swivel.

This would be a less desirable arrangement considered more common for the swivel to operate contemporaneously with the other systems.

An additional feature is adding an additional line from the pilot hydraulic system. The only change which needs to be made in the control panel is to allow the hydraulic systems to provide joysticks to run the track where the joysticks have one direction movement to control the flow in or out of the valves powering the motor. One track 54 and 54*a* joystick would be provided for each of the two track valves 19 and 19*a*.

These joysticks 54 and 54*a* could easily be placed in the space left over when the existing control 55 and 55*a* for the boom system are located.

Safety is present because there is no high pressure in the cab. Low pressure is used up top.

Environmental Control is present because the system is easy on the ground because the PSI from the track is relatively low since the weight is evenly distributed because the unit's low pressuring systems do not weigh as much. The high pressure machines are bigger and therefore weigh more. Because the boom system here is low pressure it is a lighter unit. This is a significant 10–15,000 pound difference. It also uses less fuel and the cost of repairing and running a low diesel system is much less.

The valves used are specially designed. They have a motor spool present. The spool is what slides back and forth to open and close the valves. A motor spool is a ½ inch rod and cut out where hydraulic fluid goes through. Instead of going straight down, the rod defines a taper and this allows for the hydraulic fluid to be taken off slowly, not quickly. This makes the system operate more smoothly. If not tapered, but was straight, the fluid would rush in and the tracks would jerk the system.

A process is also thereby described, which comprises the following steps:

Providing a source of hydraulic fluid under high pressure; applying the high pressure hydraulic fluid to valve stem.

Controlling the hydraulic fluid at a predetermined pressure allowing at least one valve with the hydraulic fluid.

Returning hydraulic fluid from the valve to the hydraulic fluid reservoir channeling the remaining hydraulic fluid through a power beyond to a second valve input.

Controlling the pressure at the second input to a hydraulic system having at least one third less the pressure as the high pressure hydraulic system.

Powering a second set of valves with the hydraulic fluid and returning the hydraulic fluid to the same tank.

Another possible modification would be to take the hydraulic fluid from the high pressure system and returning it to a separate tank having an increased scrubbing capability.

The purpose of this would be to provide additional filtering for the high pressure hydraulic fluid than the low pressure hydraulic fluid. Since much of the low pressure hydraulic fluid would not need to go to the high filtered system (Because this low pressure fluid would not be powering the high pressure and high dirt saws and tracks), this arrangement would allow for greater efficiency of the filtering system since only half of the filtering system (that from the high pressure side) would need the increased scrubbing and filtering. This could extend the life of the filters.

The same can be said of the cooling system. The high pressure hydraulic fluid could pass through additional cooling procedures while the low pressure hydraulic fluid would not need the not need to go to the high filtered system (Because this low pressure fluid would not be powering the high pressure and high dirt saws and tracks), this arrangement would allow for greater efficiency of the filtering system since only half of the filtering system (that from the high pressure side) would need the increased scrubbing and filtering. This could extend the life of the filters.

The same can be said of the cooling system. The high pressure hydraulic fluid could pass through additional cooling procedures while the low pressure hydraulic fluid would not need the same degree of cooling.

Figure 4:
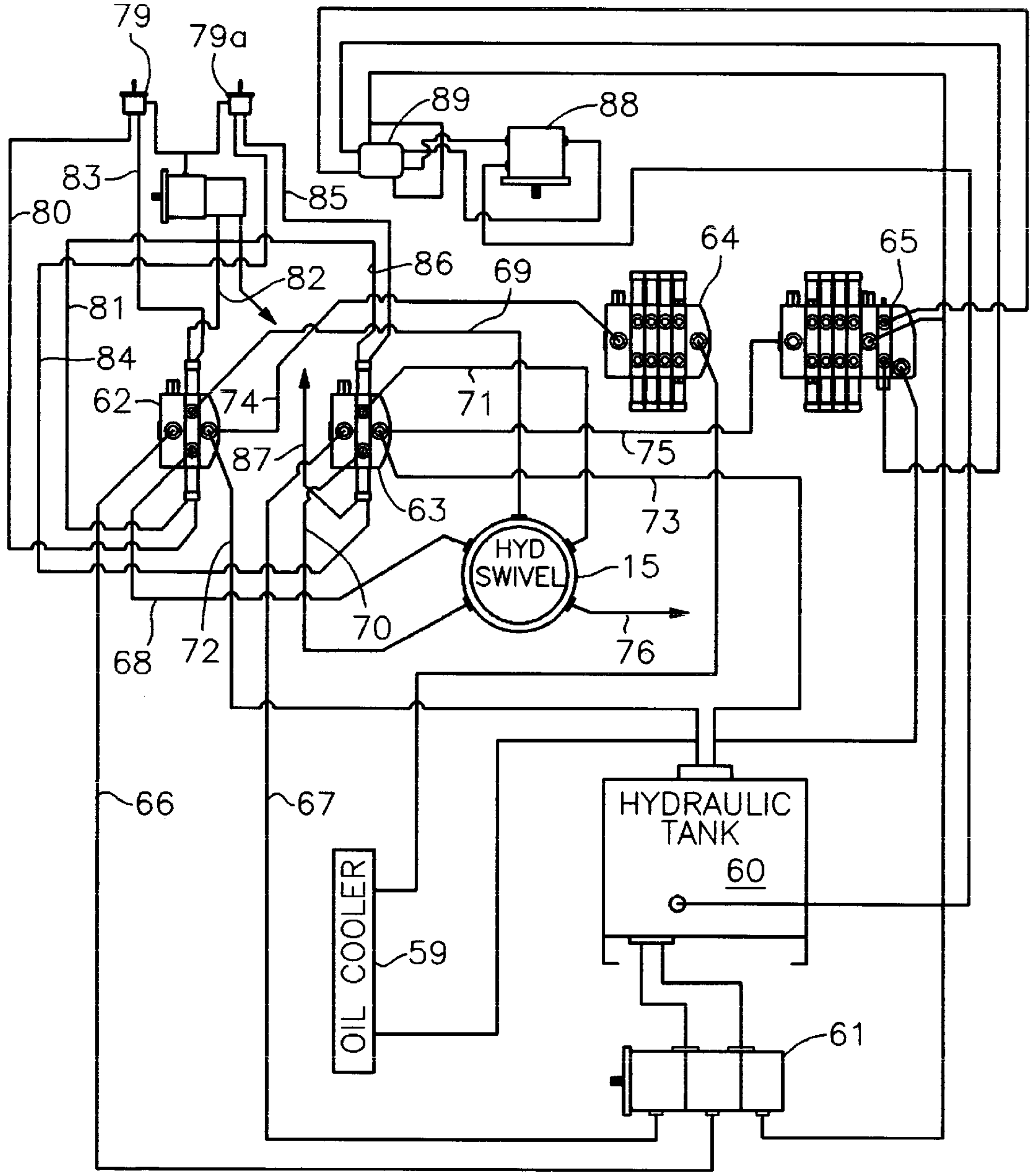
FIG. 4 shows one alternate embodiment of the upper hydraulic circuit of the disclosed invention showing the valves for the high pressure and low pressure systems.
Figure 5:
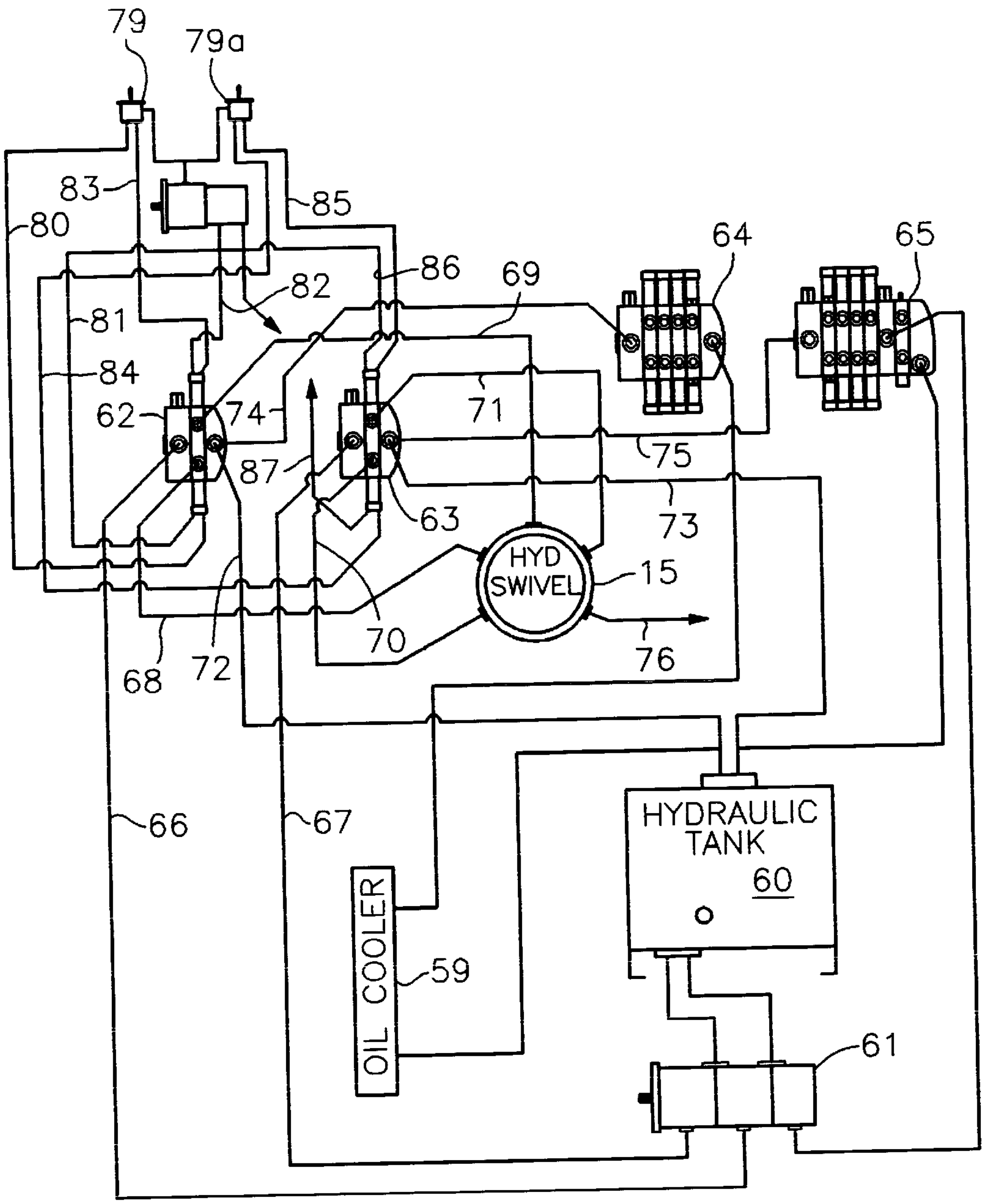
FIG. 5 shows a second alternate embodiment of the upper hydraulic circuit

Two alternative hydraulic circuits, both for the upper hydraulics utilizing this system are shown in FIGS. 4 and 5.

Shown in FIG. 4 there is: a main pump 61 is connected to cushion valve 89. The cushion valve 89 runs to swing motor

88 and to existing main valve 65 for the swing section. The existing main valve 65 goes to power beyond line 75 and also returns to the hydraulic tank 60 as well as powering items not shown. The fluid from the power beyond line 75 goes to the reverse track line—right track 71 runs from the hydraulic swivel 15 to the right track valve 63. The left track return flow 72 runs from the left track valve 62 to the hydraulic tank 60. The right track return flow line 73 runs from the right track valve 63 to the hydraulic tank 60.

A left track valve 62, a right track valve 63 also returns to the hydraulic tank 60. The second existing main valve 64 runs thru the oil cooler 59 and to the hydraulic tank 60. The second power beyond line 74 runs to the left track valve 62 from the existing main valve 64 thru the oil cooler 59 to the hydraulic tank 60.

The existing main valve 65 for the swing section also empties to the hydraulic tank 60.

The 50 GPM pressure line—left track 66 runs to the left track valve 62. The 50 GPM pressure line—right track 67 runs to the right track valve 63. The forward track line—left track 68 runs from the hydraulic swivel 15 to the left track valve 62. The reverse track line—left track 69 runs from the hydraulic swivel 15 to the left track valve 62. The forward track line—right track 70 runs from the hydraulic swivel 15 to the right track valve 63.

The power beyond line 75 runs from the right track valve 63 to the existing main valve with swing section 65 and to the hydraulic tank 60.

The pilot line for lower functions 76 runs from the hydraulic swivel 15 and then controls the lower motors (not shown). The pilot tank 77 runs thru the pilot reverse return line—left track 82 to the left track valve 62. The pilot pump 78 runs thru the track joystick 79 to the pilot forward control line—left track 80 into the left track valve 62, and also thru the pilot reverse control line—right track line 85 on to the right track valve 63. The track joystick 79 runs along the pilot reverse control line—left track line 83 to the left track valve 62 and the track joystick 79*a* to the pilot reverse control line—right track line 85 to the right track valve 63. The pilot forward control line— left track line 80 runs from the left track valve 62 to the track joystick 79 down along the pilot reverse control line—left track line 83 and to the left track valve 62. This allows controls 79 and 79*a* to control the valves 62 and 63.

The pilot forward return line—left track line 81 runs from the left track valve 62 to the pilot tank 77 and along the pilot reverse return line—left track line 82 to the left track valve 62. The pilot reverse return line left—track 82 runs from the left track valve 62 to the pilot tank 77. The pilot reverse control line—left track line 83 runs from the left track valve 62 to the track joystick 79. The pilot forward control line—right track line 84 runs from the right track valve 63 to the track joystick 79*a* along the pilot reverse control line—right track 85 back to the right track valve 63. The pilot reverse control line—right track line 85 runs from the right track valve 63 to the track joystick 79*a*. The pilot reverse return line—right track 86 runs from the right track valve 63 to the pilot tank 77. The pilot forward return line—right track 87 runs from the right track valve 63 to the pilot tank 77 (the line is not fully drawn but arrows point to the junction.

The swing motor 88 is run by the cushion valve 89 from the existing main valve with swing section 65 and into the hydraulic tank and also from the cushion valve 89 to the existing main valve with swing section 65 to the hydraulic tank. The cushion valve 89 runs from the swing motor 88 thru the existing main valve with swing section 65 to the hydraulic tank.

Shown in FIG. 5 the main pump 61 runs thru the existing main valve with swing section 65 along the power beyond line 75 to the right track valve 63 thru the right track return flow line 73 down to the hydraulic tank 60. The left track valve 62 runs from the main pump 61 thru the 50 GPM pressure line—left track 66.

Valve 62 is controlled by joystick 79 which has a pilot reverse return line—left track 82 to the pilot tank 77. The right track valve 63 runs from the main pump 61 along the 50 GPM pressure line—right track 67 thru the reverse track line—right track 71 to the hydraulic swivel 15. The existing main valve 64 runs down thru the oil cooler 59 and back to the hydraulic tank 60. It receives power from the power beyond line 74 which runs from the left track valve 62.

The existing main valve with swing section 65 sends fluid along the power beyond line 75 and to the right track valve 63 and also empties to the hydraulic tank 60.

The 50 GPM pressure line—left track 66 runs from the main pump 61 to the left track valve 62. The 50 GPM pressure line—right track 67 runs from the main pump 61 to the right track valve 63.

The forward track line—left track 68 runs from the left track valve 62 to the hydraulic swivel 15. The reverse track line—left track 69 runs from the left track valve 62 to the hydraulic swivel 15. The forward track line—right track 70 runs from the right track valve 63 to the hydraulic swivel 15.

The reverse track line—right track 71 runs from the right track valve 63 to the hydraulic swivel 15. The left track return flow line 72 runs from the left track valve 62 to the hydraulic tank 60. The right track return flow line 73 runs from the right track valve 63 to the hydraulic tank 60.

The power beyond line 74 runs from the left track valve 62 to the existing main valve 64 to the hydraulic tank 60. The power beyond line 75 runs from the right track valve 63 thru the existing main valve with swing section 65 down to the hydraulic tank 60.

The pilot line for lower functions 76 runs from the hydraulic swivel 15. The pilot tank 77 supplies fluid along the pilot reverse return line—left track 82 to the left track valve 62. The pilot pump 78 runs from the track joystick 79 along the pilot forward control line left track 80 to the left track valve 62 and also along the pilot reverse control line—right track 85 to the right track valve 63.

The track joystick 79 runs along the pilot forward control line—left track 80 to the left track valve 62. Joystick 79*a* runs along the pilot reverse control line—right track 85 to the right track valve 63. The pilot forward control line—left track 80 runs from the track joystick 79 to the left track valve 62. The pilot forward return line—left track 81 runs from the pilot tank 77 to the left track valve 62. The pilot reverse return line—left track 82 runs from the pilot tank 77 to the left track valve 62. The pilot reverse control line—left track 83 runs from the left track valve 62 to the track joystick 79. The pilot forward control line—right track 84 runs from the right track valve 63 to the track joystick 79. The pilot reverse control line—right track 85 runs from the right track valve 63 to the track joystick 79. The pilot reverse return line—right track 86 runs from the right track valve 63 to the pilot tank 77. The pilot forward return line—right track 87 runs from the right track valve 63. Having thus described the invention, it may be extended by adding at least one second power beyond said power beyond having an inlet for receiving hydraulic fluid from the at least one power beyond outlet at the return pressure and at least one second converter means for converting the hydraulic fluid from the at least one power beyond to a second lower beyond pressure at the at least one power beyond outlet; at least one second low pressure valve having an inlet for receiving hydraulic fluid from the at least one power beyond outlet for operating a second low pressure hydraulic fluid device. The second converter means converts the hydraulic fluid to a lower pressure than the first converter means.

Because many varying and different embodiments may be made within the scope of the inventive concept herein taught and because many modifications may be made in the embodimant(s) herein detailed in accordance with the descriptive requirements of the law, it is to be understood that the details herein are to be interpreted as illustrative and not in a limiting sense.

I claim:

1. A dual hydraulic pressure system for operating at least one high pressure motor and at least one low pressure motor comprising;

A) at least one pump means for providing a source of high pressure fluid;

B) at least one valve for operating a high pressure hydraulic device, said at least one valve having an inlet and an outlet for receiving and returning hydraulic fluid at a return pressure from the pump source respectively;

C) at least one power beyond said power beyond having an inlet for receiving hydraulic fluid from the at least one valve outlet at the return pressure, a line having an input and an output, said input attached to the power beyond, D) at least one second valve having a valve input, said valve input being attached to the line output, and a converter means connected to the valve input for converting the hydraulic fluid from the at least one power beyond to a lower beyond pressure at the at least one power beyond outlet so that the at least one second valve may operate a low pressure hydraulic fluid device at the lower beyond pressure.

2. The invention of claim 1 wherein the system further comprises a motor and wherein the pump means is powered by the motor and wherein the pump means is comprised of a hydraulic pump connected to the inlet of the at least one valve inlet.

3. The invention of claim 1 wherein the system further comprises a drive train and a boom system and wherein the high pressure device comprises the at least one high pressure motor connected to the drive train for moving the hydraulic pressure system and wherein the low pressure hydraulic fluid device further comprises a boom system.

4. The invention of claim three wherein the drive train further comprises at least one axle connected to the hydraulic motor which carries at least one wheel.

5. The invention of claim 4 wherein the drive train further comprises at least one caterpillar track turned by the at least one high pressure motor.

6. The invention of claim 1 wherein the high pressure hydraulic device is at least 40 percent higher pressure than the low pressure hydraulic system.

7. The invention of claim 1 further comprising at least one second power beyond said power beyond having an inlet for receiving hydraulic fluid from the at least one power beyond outlet at the return pressure and at least one second converter means for converting the hydraulic fluid from the at least one power beyond to a second lower beyond pressure at the at least one power beyond outlet; at least one second low pressure valve having an inlet for receiving hydraulic fluid from the at least one power beyond outlet for operating a second low pressure hydraulic fluid device.

8. The invention of claim 7 wherein the second converter means converts the hydraulic fluid to a lower pressure than the first converter means.

9. A process for providing dual pressure hydraulic fluid on a platform comprising the steps of:

(a) providing a first source of first hydraulic fluid under high pressure;

(b) applying the first hydraulic fluid to a first hydraulic valve at a first pressure;

(c) sending a first portion of the first hydraulic fluid to a first hydraulic machine;

(d) sending a second portion of the first hydraulic fluid by way of a power beyond on the first hydraulic valves to a pressure decreasing means for lowering the pressure from the first pressure to a second pressure which second pressure is lower than the first pressure;

(e) sending the second portion of the first hydraulic fluid at the second pressure to a second hydraulic valve;

(f) sending the second portion of the first hydraulic fluid to a second hydraulic machine.

10. The under high pressure invention of claim 9 further comprising a second and third hydraulic machine(a) at least one second pump means for providing a second supply of high pressure hydraulic fluid;

(b) applying the second supply of high pressure hydraulic fluid to a third hydraulic valve at a third pressure;

(c) sending a first portion of the second supply of high pressure hydraulic fluid by way of a power beyond on the first hydraulic valves to a third hydraulic machine;

(d) sending a second portion of the second supply of high pressure hydraulic fluid to a pressure decreasing means for lowering the pressure from the third pressure to a fourth pressure which fourth pressure is lower than the third pressure;

(e) sending the second portion of the second hydraulic fluid at the fourth pressure to the fourth hydraulic valve;

(f) sending the portion of hydraulic fluid at the fourth pressure to the fourth hydraulic machine.

11. The invention of claim 10 wherein the power to energize pumps for the first source of hydraulic fluid and second source of hydraulic fluid is provided by the same engine.

12. The invention of claim 6 wherein the high pressure hydraulic device operates between 3,500 and 25,000 PSI and wherein the low pressure hydraulic device operates between 1,000 and 3,000 PSI.

13. The invention of claim 10 wherein the second pressure and the fourth pressure are different pressures.

14. The process of claim 9 wherein the hydraulic fluid at the first pressure powers a hydraulic machine in the form of a drive mechanism for moving the platform.

15. The process of claim 14 wherein the hydraulic fluid at the second pressure powers a hydraulic machine in the form of a boom for working an arm and clamp means for loading timber.

16. The process of claim 9 further comprising returning the hydraulic fluid to the same tank.

17. The process of claim 16 further comprising filtering the hydraulic fluid at the first pressure before returning the hydraulic fluid to the tank.

18. The process of claim 16 further comprising cooling the hydraulic fluid at the first pressure before returning the hydraulic fluid to the tank.

19. The process of claim 9 wherein the hydraulic fluid second pressure is at least one third less than the hydraulic fluid first pressure.

20. A process for providing dual pressure hydraulic fluid on a platform comprising the steps of:

(a) providing a first source of first hydraulic fluid under high pressure;

(b) applying the first hydraulic fluid to a first hydraulic valve at a first pressure;

(c) sending a first portion of the first hydraulic fluid to a first hydraulic machine;

(d) sending a second portion of the first hydraulic fluid by way of a power beyond on the first hydraulic valve to a pressure decreasing means for lowering the pressure from the first pressure to a second pressure which second pressure is lower than the first pressure;

(e) sending the second portion of the first hydraulic fluid at the second pressure to a second hydraulic valve;

(f) sending the second portion of the first hydraulic fluid to a second hydraulic machine;

(g) sending a second portion of the second hydraulic fluid by way of a second power beyond on the second hydraulic valve to a pressure decreasing means for lowering the pressure from the second pressure to a third pressure which third pressure is lower than the second pressure;

(i) sending the second portion of hydraulic fluid at the third pressure to a third hydraulic machine.

* * * * *